[11] 3,555,987

[72] Inventor Iben Browning
Sunnyvale, Calif. (745 Distel Drive, Los Alto, Calif. 94022)
[21] Appl. No. 703,646
[22] Filed Feb. 7, 1968
[45] Patented Jan. 19, 1971

[54] FOCAL PLANE SHUTTER SYSTEM
10 Claims, 4 Drawing Figs.
[52] U.S. Cl. .................................................. 95/53, 350/150, 350/167
[51] Int. Cl. ................................................... G03b 9/56
[50] Field of Search ...................................... 95/53; 350/150, 160, 167, (FE-EO Digest); 95/4.5

[56] References Cited
UNITED STATES PATENTS
2,897,399   7/1959   Garwin et al. ................. 350/160X
3,300,266   1/1967   Browning ...................... 350/167X
3,468,598   9/1969   Ito ................................. 350/167X OTHER REFERENCES
Buessem et al., " Phenomenological Theory of High Permittivity in Fine-Grained Barium Titanate" J. Am. Ceramic Soc. Vol. 49 (January, 1966) pp. 33— 36 Shabana et al., " Electrooptical Activity of Localized Perpendicularly Switched Domains in Ferroelectric Crystal" Proc. IEEE vol. 54 (January, 1966) pp. 85—86

Cummins, " A New Optically Read Ferroelectric Memory" and "A New Bistable Ferroelectric Light Gate or Display Element" Proc. IEEE Vol. 55 (August, 1967) pp. 1536—1538

Land, " Ferroelectric Ceramic Electrooptic Storage and Display Devices" Sandia Corporation Reprint SC-R-67-1219 (October, 1967) pp1— 6, 17— 23, Fig. 13— 17 relied on

*Primary Examiner*—David Schonberg
*Assistant Examiner*—Paul R. Miller
*Attorney*—Limbach, Limbach & Sutton ABSTRACT: A focal plane shutter system is disclosed wherein an electrically controlled high-speed ceramic lattice shutter array is interposed between first and second lens mosaics whereby light from an object incident on the first lens mosaic through a field lens is focused in the form of a plurality of image fragments on the ceramic lattice shutter array for high-speed shuttering and selective transmission therethrough and wherein the selectively transmitted light is focused by the second lens mosaic to form a reconstituted image on a film plane. The second lens mosaic may be eliminated and the film plane placed immediately adjacent the ceramic lens shutter array when light from an object incident on the first lens mosaic is focused to a plurality of intense spots representative of the image rather than to a plurality of image fragments.

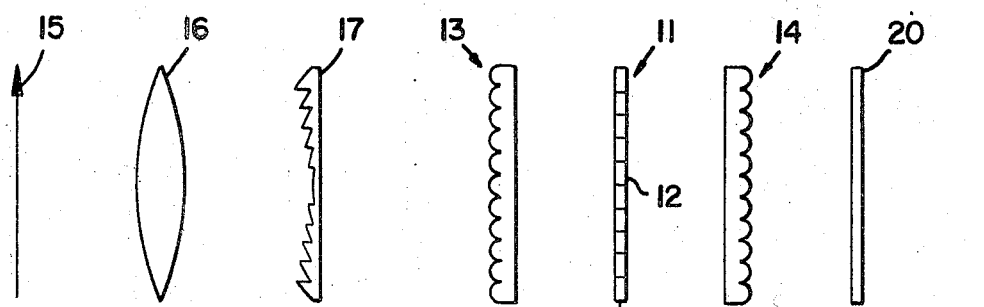
FIG_1
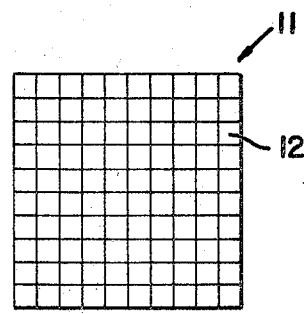
FIG_1a
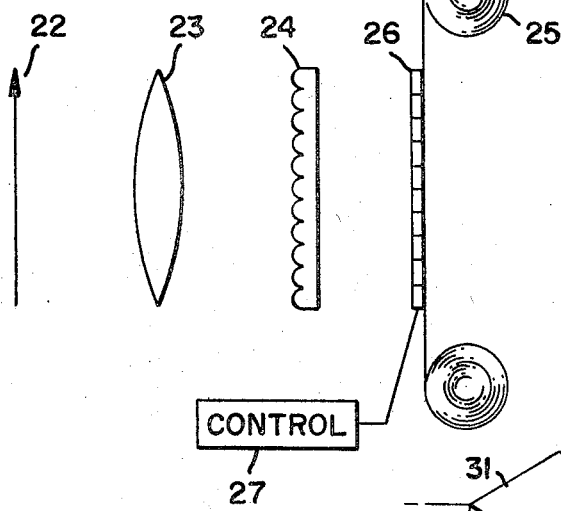
FIG_2
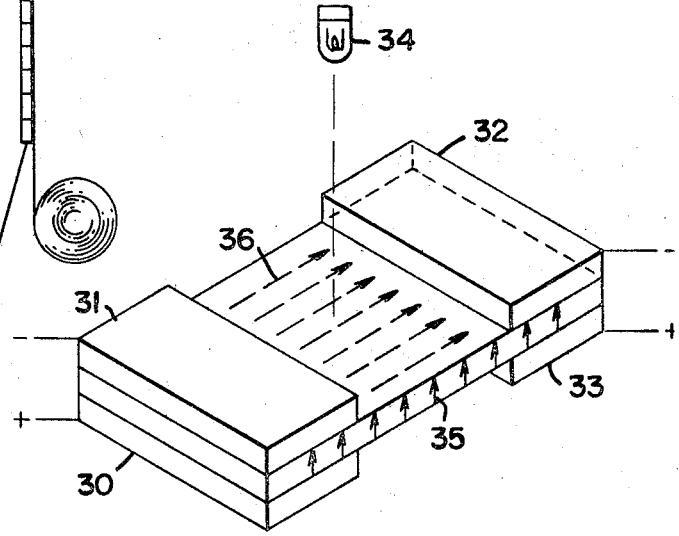
FIG_3
INVENTOR.
IBEN BROWNING
BY
Townsend and Townsend
ATTORNEYS

FOCAL PLANE SHUTTER SYSTEM

This invention relates to a new and improved focal plane shutter system useful in extremely high-speed shuttering and selective shuttering applications.

Certain ferroelectric ceramic materials have been developed having an anisotropic optical response under polarization. Thus, polycrystalline coarse-grained (over 2 microns) hot-pressed lead zirconate-lead titanate ceramics when polarized in a direction normal to the major surface to which light is incident are substantially transparent and when polarized in a direction normal to the major surface to which light is incident are substantially opaque. Polarization may be accomplished by an externally applied electric field and the light transmitting state of the ceramic persists after removal of the electric field. The transmissive state of the ceramic may be switched by switching the direction of polarization and such switching may be accomplished at extremely high speeds in the order of microseconds.

It is an object of the present invention to provide a new and improved focal plane shutter system providing extremely high-speed shutter operation in the microsecond range.

Another object of the invention is to provide selective shuttering of incident light by a high-speed shutter array having independently and electrically controlled shutter portions.

In order to accomplish these results, the present invention contemplates the provision of an electrically controlled high-speed ceramic lattice shutter array comprised of a plate of ferroelectric ceramic material having an anisotropic optical response when polarized and a plurality of electrodes across the plate for selectively applying external electric polarizing fields to localized regions of the plate. The invention also contemplates interposing the ceramic lattice shutter array between first and second lens mosaics, each lens mosaic comprised of a multitude of tiny lenses in a closely packed array.

According to the present invention, light from an object incident on the first lens mosaic through an objective lens and field lens is focused on the ceramic lattice shutter array in the form of a plurality of image fragments formed by the lenses comprising the lens mosaic. Control means for the electrodes of the ceramic lattice provide high-speed and selective shuttering of the image fragments. The selectively transmitted light is focused by the second lens mosaic to form a reconstituted image on a film plane.

According to another aspect of the invention the second lens mosaic is eliminated and the film plane positioned immediately adjacent the ceramic lattice. Light from an object incident on the first lens mosaic is focused to a plurality of intense spots representative of the image rather than image fragments. High-speed and selective control of the shutter array transmits the light spots onto the adjacent film plane.

Other objects, features and advantages of the present invention will become apparent in the following specification and accompanying drawing.

In the drawing:

FIG. 1 is a diagrammatic view from the side of one optical train embodying the present invention. FIG. 1a is a perspective view of a localized region of the shutter array in the optical train.

FIG. 2 is a diagrammatic view from the side of another optical train embodying the present invention.

FIG. 3 is a diagrammatic perspective view of a localized region of the ceramic lattice shutter array showing a portion of the ceramic material and a set of electrodes.

In the embodiment of the present invention illustrated in FIG. 1 there is provided a ceramic lattice shutter array 11 comprised of a plate of ferroelectric ceramic material, such as hot-pressed lead zirconate-lead titanate. A plurality of electrodes are fixed across the area of the plate for externally applying electric polarizing fields to localized regions 12 thereby forming the individual shutter portions of the shutter array 11 as shown in FIG. 1a. The ceramic lattice shutter array is interposed between first and second lens mosaics 13 and 14. Light from an object 15 is focused by objective lens 16 through field lens 17 and is incident on the first lens mosaic 13. If a fresnel field lens 17 is used, it should be positioned in the image plane of the objective lens 16 because of the light scattering produced by the fresnel lens. Other types of field lenses need not be positioned in the image plane of objective lens 16.

Light incident on the first lens mosaic 13 is focused to a plurality of image fragments on the ceramic lattice shutter array 11. High-speed shuttering of the shutter array by control means 18 may open the entire array so that each of the image fragments is transmitted through or may selectively open only certain of the component shutters of the array for selective transmission of light.

Light transmitted through the ceramic lattice shutter array is focused by the second lens mosaic 14 to form a reconstituted image on the film plane 20 positioned in the image plane of lens mosaic 14.

Because the localized portions of the ceramic lattice shutter array 11 are not completely transparent to light in the transmitting state, but merely translucent, the ceramic lattice should be positioned in the image plane of the lens mosaic 13 in order not to obscure or diffuse the image fragments formed by the lens mosaic. Additionally, because of a plurality of electrodes affixed across the area of the ceramic plate, the lens mosaic should be positioned with respect to the ceramic lattice so that the image fragments formed by the individual lenses comprising the lens mosaic fall upon portions of the ceramic material intermediate electrodes fixed thereon so that the electrodes do not interfere with light to be transmitted through the shutter array. Thus, by means of the lens mosaic, an incident image is broken into image fragments for transmission through the ceramic lattice between the electrodes affixed thereon in order not to lose any image information. The second lens mosaic then reconstitutes the image on a film plane.

In the embodiment of the invention illustrated in FIG. 2, light from an object 22 is focused through an objective lens 23 to form an image on the lens mosaic 24. The lens mosaic is designed to dissect the image into a plurality of intense spots representative of the light at the portion of the image incident on any particular lens of the lens mosaic. Thus, an image is formed from a plurality of spots of light representative of the original image on a film 25 passed at the focal plane of the lenses comprising the lens mosaic 24. A ceramic lattice shutter array 26 similar to that heretofore described may then be positioned immediately adjacent the film plane for high-speed and selective shuttering of the light by means of the electrical control means 27.

In the embodiment of the invention illustrated in FIG. 2, the photographic film 25 may be mounted for motion across the image plane of the lens mosaic 24 in order to record motion of the object 22. For moving pictures, the lens mosaic 24 would be oriented with respect to the film 25 so that the exposure streaks produced by each of the lenses of the lens mosaic are nonoverlapping with the exposure streaks formed by any other of the lenses of the lens mosaic. High-speed shuttering by the ceramic lattice 26 would permit unique photographic effects. Furthermore, for a sequence of still pictures, high density photographic storage is possible by similar orientation so that the sequence of the exposure spots on the photographic film from any one lens of the lens mosaic is nonoverlapping with the sequence of exposure spots formed by any other lens of the lens mosaic. Thus, only a small incremental advancement of the film is necessary between exposures. Such techniques are fully set forth in my U.S. Pat. No. 3,367,826 issued on Aug. 23, 1966.

A localized region of the ceramic lattice performing a shuttering function in the shutter array is shown in FIG. 3. Thus, a plurality of electrodes 30 through 33 are positioned about a portion of the ceramic plate for application of external electric polarizing fields either normal or parallel to the major surface to which light from light source 34 is incident. Thus, in the configuration shown in FIG. 3 the polarizing field produces polarization in the direction of the solid arrows 35 normal to the major surface on which light is incident thereby rendering the ceramic material substantially transparent to the incident light 34 which is transmitted through. With a negative bias on electrodes 32 and 33 and a positive bias on electrodes 31 and 30, polarization would be in the direction of the dotted arrows 36 thereby rendering the ceramic material substantially opaque to the incident light.

The ceramic lattice shutter array may itself be used to form images by selective control of the light transmitting state of the localized shutter portions. Thus, the lens mosaic 24 and ceramic lattice shutter array 26 as shown in FIG. 2 may be utilized in a manner analogous to a television screen or cathode ray tube. In that event, the elements 22 and 23 would be replaced with a light source, and the film 25 replaced with a screen such as a light-diffusing frosted screen positioned next to the shutter array. The lens mosaic is positioned with respect to the ceramic lattice shutter array to focus spots of light on the ceramic plate on portions of the plate intermediate the electrodes. The transmitted spots of light, representative of an image according to the configuration of transmitting portions on the ceramic plate, are diffused on the screen to form the image.

While only certain embodiments of the present invention have been shown and described, other modifications and adaptations would be apparent without departing from the true spirit and scope of the following claims.

I claim:

1. A focal plane shutter system comprising: a first lens mosaic adapted to form a plurality of image fragments from an image incident thereon in a plane spaced from said lens mosaic; a ceramic lattice shutter array comprising a plate of ferroelectric ceramic material having an anisotropic optical response while polarized and a plurality of electrodes across the surface of said plate for externally applying electric polarizing fields to localized portions of the plate, said ceramic lattice being positioned in the image plane of said first lens mosaic, a second lens mosaic spaced from said ceramic lattice on the side opposite said first lens mosaic and adapted to receive light transmitted through the ceramic lattice and focus said light to form a reconstituted image in a plane spaced from said second lens mosaic; and control means for electrically controlling the electrodes of the ceramic lattice.

2. The focal plane shutter system of claim 1 with each of the lenses of said first lens mosaic constructed and positioned to form an image of the image fragment incident thereon on only a portion of said plate in between said electrodes and each of the lenses of said second lens mosaic constructed and positioned to form a reconstituted image of only the light transmitted through the ceramic lattice in between said electrodes.

3. A focal plane shutter system as set forth in claim 1 wherein there is further provided an objective lens and a field lens spaced from the objective lens for focusing light from an object on said first lens mosaic.

4. A focal plane shutter system as set forth in claim 1 wherein there is further provided a photographic film plane in the image plane of said second lens mosaic.

5. A focal plane shutter system comprising: a lens mosaic adapted to focus light incident thereon to a plurality of intense spots representative of the light incident on said lens mosaic in a plane spaced from said lens mosaic; a ceramic lattice shutter array comprising a plate of ferroelectric ceramic material having an anisotropic optical response when polarized and a plurality of electrodes positioned across the area of said plate for externally applying electric polarizing fields to localized portions of the plate, said ceramic lattice being positioned in the image plane of said lens mosaic; and control means for electrically controlling the electrodes of said ceramic lattice for shuttering and selectively transmitting the spots of light incident thereon from said lens mosaic.

6. A focal plane shutter system as set forth in claim 5 wherein there is further provided an objective lens for focusing light from an object onto said lens mosaic.

7. A focal plane shutter system as set forth in claim 5 wherein there is further provided a photographic film in the image plane of said lens mosaic.

8. A focal plane shutter system as set forth in claim 5 wherein there is a photographic film mounted in the image plane of said lens mosaic, said photographic film being mounted for advancement across the image plane of said lens mosaic and wherein said lens mosaic is oriented with respect to the direction of advancement of said film whereby the exposure streak on said film produced by any lens of the lens mosaic is substantially nonoverlapping with the exposure streaks on said film produced by any other lenses of the lens mosaic.

9. A focal plane shutter system comprising: a lens mosaic adapted to focus light incident thereon to a plurality of intense spots representative of the light incident on said lens mosaic in a plane spaced from said lens mosaic; a ceramic lattice shutter array comprising a plate of ferroelectric ceramic material having an anisotropic optical response when polarized and a plurality of electrodes positioned across the area of said plate for externally applying electric polarizing fields to localized portions of the plate, said ceramic lattice being positioned with respect to said lens mosaic to focus substantially all the focused spots of light on portions of the plate intermediate the plurality of electrodes; and control means for electrically controlling the electrodes of said ceramic lattice for shuttering and selectively transmitting the spots of light incident thereon from said lens mosaic.

10. A focal plane shutter system as set forth in claim 9 wherein a screen is positioned next to the ceramic lattice shutter array on the side opposite the lens mosaic.